United States Patent [19]
Burgess

[11] 3,874,234
[45] Apr. 1, 1975

[54] VORTEX SHEDDING FLOWMETER

[75] Inventor: Thomas H. Burgess, Horsham, Pa.

[73] Assignee: Fischer & Porter Co., Warminster, Pa.

[22] Filed: June 27, 1973

[21] Appl. No.: 374,114

[52] U.S. Cl. ............................................. 73/194 B
[51] Int. Cl. ................................................ G01f 1/00
[58] Field of Search ................ 73/194, 205; 138/44

[56] References Cited
UNITED STATES PATENTS

| | | | |
|---|---|---|---|
| 1,145,234 | 7/1915 | Dodge | 73/213 X |
| 1,266,428 | 5/1918 | Dodge | 73/213 |
| 1,935,445 | 11/1933 | Heinz | 73/194 |
| 3,116,639 | 1/1964 | Bird | 73/194 |
| 3,175,399 | 3/1965 | Medlar | 73/194 |
| 3,698,245 | 10/1972 | McNabb | 73/194 |

*Primary Examiner*—Herbert Goldstein
*Attorney, Agent, or Firm*—Michael Ebert

[57] ABSTRACT

A vortex shedding flowmeter in which an obstacle is mounted within a flow conduit to produce periodic vortices whose frequency is a function of the flow rate of the fluid passing through the conduit. The conduit is interposed between an upstream and a downstream pipe section in the line conveying the fluid to be metered. To render the flowmeter insensitive to differences in velocity distribution in the fluid entering the flow conduit, the internal diameter of the conduit is made smaller than that of the upstream pipe section to create a constriction in the flow passage which renders the flow distribution profile more uniform and thereby improves the accuracy and reliability of the meter.

4 Claims, 8 Drawing Figures

Upstream Pipe Section / Vortex Shedding Body / Downstream Pipe Section

PRIOR ART

Velocity Profile

Velocity Profile

Velocity Profile

VORTEX SHEDDING FLOWMETER

BACKGROUND OF THE INVENTION

This invention related generally to flowmeters for metering liquids or gases, and more particularly to improved flowmeters of the vortex-shedding type.

It is well known that under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. It is this phenomenon which is exploited to create a flowmeter. Flowmeters of the vortex-shedding type are disclosed in the Bird U.S. Pat. No. 3,116,639 and in the Rodley U.S. Pat. No. 3,572,117, among others.

My prior U.S. Pat. No. 3,589,185 discloses an improved form of vortex-type flowmeter wherein the signal derived from the fluid oscillation is relatively strong and stable to afford a favorable signal-to-noise ratio insuring accurate flow-rate information over a broad range. In this meter, an obstacle assembly is mounted in the flow conduit, the assembly being constituted by a block positioned across the conduit with its longitudinal axis at right angles to the direction fluid flow, a strip being similarly mounted across the conduit behind the block and being spaced therefrom to define a gap which serves to trap Karman vortices and to strengthen and stabilize the vortex street. This street is sensed by a pressure or other form of transducer to produce an electrical signal whose frequency is proportional to flow rate.

A typical vortex-shedding flowmeter of known design includes a flow conduit having mounting flanges at the ends of the conduit. One mounting flange is bolted or otherwise attached to the complementary flange on an upstream pipe section of the pipe line carrying the fluid whose rate is to be metered, the other conduit flange being attached to the complementary flange of the downstream section. To avoid discontinuity in fluid flow, the internal diameter of the flow conduit in a prior art flowmeter is designed to match that of the pipe sections to which it is coupled.

In order for a vortex-shedding flowmeter to perform accurately and reliably, the velocity distribution profile of the fluid entering the meter must be reasonably uniform. Present meter designs exhibit a sensitivity to upstream piping which tend to limit their use to those installations where long, straight upstream piping is available. The reason for this limitation is that when the velocity of incoming fluid has an irregular or asymmetric distribution at a point which is well upstream, in passing through a long straight pipe to reach the flowmeter, the fluid velocity distribution is rendered more uniform. But if only a short length of straight upstream piping is available, then the incoming fluid velocity profile remains irregular and the flowmeter reading is inaccurate and unreliable.

Inasmuch as there are many situations in which it is necessary to measure flow rate at a position where only a short upstream pipe is available, it is not possible with existing vortex meters to make an installation in these situations that will afford accurate readings. This is also true for longer upstream piping which includes a bend or elbow that renders the velocity profile irregular.

The major problem with prior art flowmeters is that differences in the profile due to differences in upstream piping cause the shedding frequency to change (for the same flow rate), giving rise to measurement errors. Even when long, straight upstream piping is available, these errors can be significant in a prior art meter if the flowmeter internal diameter is not well aligned with the ID of the upstream pipe. Such flange offset is not uncommon.

SUMMARY OF THE INVENTION

In view of the foregoing, it is the main object of this invention to provide a vortex-type flowmeter which may be installed in a fluid line with relatively short lengths of upstream piping and yet afford accurate and reliable readings of flow rate. A further object of the invention is to provide a flowmeter which does not require special alignment with the upstream piping.

More particularly it is an object of this invention to provide a vortex-shedding flowmeter which is substantially insensitive to upstream piping and which produces an output signal having a favorable signal-to-noise ratio and improved linearity.

Also an object of this invention is to provide a flowmeter of the above-type which is of simple and inexpensive design and which may be manufactured at no greater cost than the cost of a conventional vortex-type flowmeter.

Briefly stated, these objects are attained in a vortex-type flowmeter in which an obstacle is mounted within a flow conduit that is interposed between the upstream and downstream pipe sections of a line carrying the fluid whose rate is to be measured, the internal diameter of the conduit at a point therein being smaller than that of the upstream pipe section to define a constriction in the flow passage which renders the flow distribution profile more uniform to improve the reliability and accuracy of the meter.

OUTLINE OF THE DRAWINGS

For a better understanding of the invention as well as other objects and features thereof, reference is made to the following detailed description to be read in conjunction with the accompanying drawings wherein.

DESCRIPTION OF THE INVENTION

Figure 1:
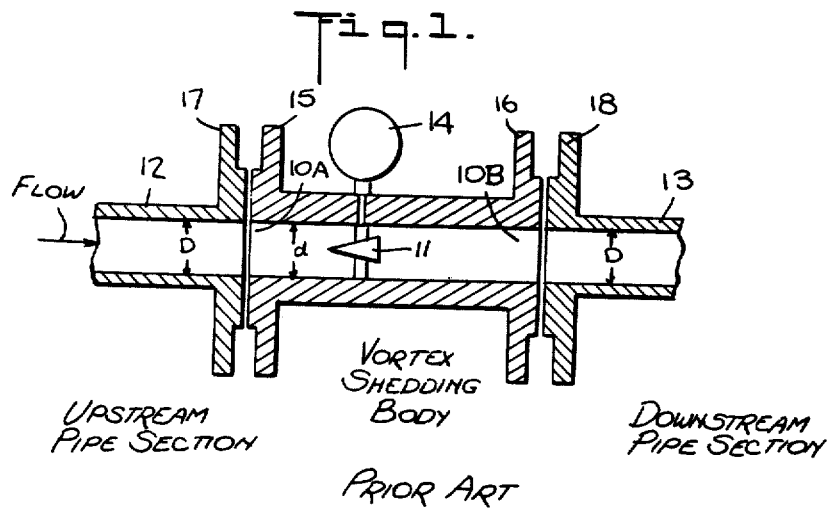
FIG. 1 is a longitudinal section taken through a vortex-shedding flowmeter of the prior art type.

Referring now to the drawing and more particularly to FIG. 1 there is shown a prior art flowmeter of the vortex-type comprising a flow conduit 10 and an obstacle assembly, generally designated by numeral 11, mounted within the conduit. The nature of the obstacle or vortex-shedding element forms no part of the present invention and may be in the form shown in any of the above-identified prior patents.

Conduit 10, which is shown as having a circular cross-section but which may be in other cross-sectional forms, includes an upstream inlet 10A into which a fluid to be metered is introduced by an upstream pipe section 12. The fluid in the outlet 10B passes into a downstream pipe section 13. The incoming flow impinges on obstacle assembly 11 which acts to divide the flow around the obstacle, the assembly producing fluidic perturbations in the form of a Karman vortex street. The nature of this phenomenon is explained in the text by Schlichtling, "Boundary Layer Theory" (McGraw-Hill, 1960).

The resultant fluidic oscillations in the downstream wake are detected by a suitable sensor or transducer which may be of any known type to produce a signal which is applied to a signal processing amplifier 14 to provide an output signal. This is applied to an indicator giving flow rate readings.

Figure 1A:
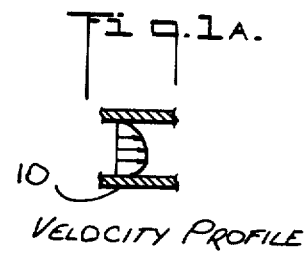
FIG. 1A is a typical velocity distribution profile of a meter of the type shown in FIG. 1.

Flow conduit 10 is provided at either end with mounting flanges 15 and 16 which are attachable to complementary flanges 17 and 18, respectively, at the ends of the upstream and downstream pipe sections 12 and 13, thereby facilitating installation and repair of the meter. It will be seen that the internal diameter D of the flow conduit 10 is the same as the internal diameter D of the upstream and downstream sections in order to avoid any discontinuity or constriction in the fluid flow passage.

Where long straight piping is available to form the upstream section 12, then, as pointed out previously, this piping tends to smooth out a velocity distribution profile which is irregular, so that the vortex-shedding meter receives fluid when velocity profile is reasonably uniform. But when the upstream piping is short, contains bends or is offset, then the meter will receive fluid having an uneven velocity profile, as shown in FIG. 1A, so the meter will not perform reliably or accurately.

Figure 2:
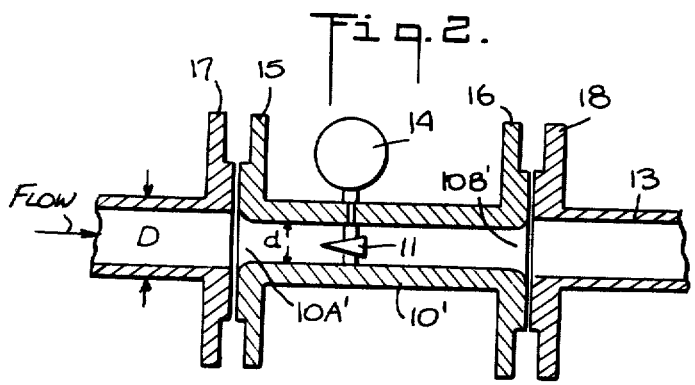
FIG. 2 is a longitudinal section showing a first preferred embodiment of a vortex-type flowmeter in accordance with the invention.

The vortex-shedding meter shown in FIG. 2 is identical to that in FIG. 1 except that the internal diameter d of the flow conduit 10 is smaller than the internal diameter D of the upstream and downstream pipe sections 12 and 13. Preferably, the ratio of the flow conduit diameter d to the upstream pipe diameter D lies in the range of 0.5 to 0.9.

At the inlet 10 A' of the flow conduit the surface is chamfered or rounded to avoid an abrupt change in the diameter of the flow passage and to provide a smooth transition in flow between the passage in the upstream pipe section and the connecting passage of reduced cross section in the flow conduit. And for the same purpose, the outlet 10 B' of the flow conduit is rounded or chamfered to smooth the transition between the flow conduit and the downstream pipe section whose cross sectional area is larger.

Figure 2A:
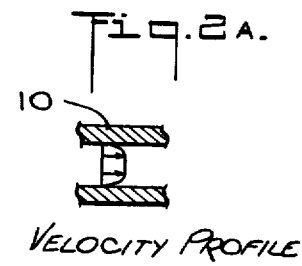
FIG. 2A is the velocity distribution profile characteristic of the meter shown in FIG. 2.

The resultant flow constriction in flow conduit 10'' tends to render the velocity profile more uniform and thereby makes the meter much less sensitive to upstream piping. If for example, the velocity distribution profile of fluid entering the meter shown in FIG. 2 has the form shown in FIG. 1A, then the constriction tends to square the profile so that it has the substantially uniform form shown in FIG. 2A. This squaring of the profile improves the performance of the meter, for the signal-to-noise ratio becomes more favorable, and the linearity thereof (the relationship between vortex frequency and flow rate) is also generally improved.

To obtain stability of the vortex street it is necessary that reduced diameter d of the flow conduit be maintained for some length beyond the vortex-shedding body 11. In the arrangement shown in FIG. 2, this is accomplished by placing obstacle 11 almost midway in conduit 10', so that about half of the length of the conduit which trails the obstacle, is of reduced diameter.

Figure 3:
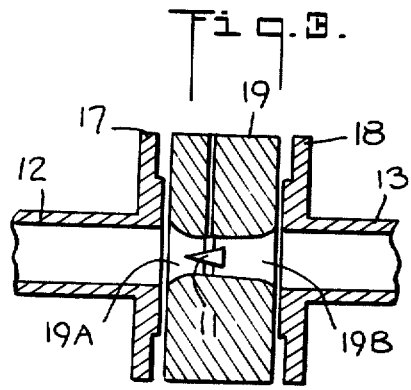
FIG. 3 is a longitudinal section showing a second preferred embodiment of a flowmeter according to the invention.

In the arrangement shown in FIG. 2, the elongated flow conduit 10', except for the chamfered inlet and outlet has a uniform internal diameter d which is reduced relative to the uniform internal diameter D of the upstream section. The arrangement shown in FIG. 3 is designed to substantially shorten the required length of the flow conduit while retaining the advantages gained by the introduction of a constriction in the flow path.

This is accomplished by a short flow conduit 19 having obstacle 11 mounted therein adjacent to the flow inlet 19A whose inner diameter has a convergent or conical formation which progressively changes in dimension from a value D equal to the internal diameter of the upstream section to a smaller value d to define the constriction. The portion of the flow conduit which is downstream of obstacle 11 gradually increases in diameter from the minimum d value to a larger value, the outlet 19B being chamfered to provide a smooth flow transition to the downstream pipe section 13.

Figure 3A:
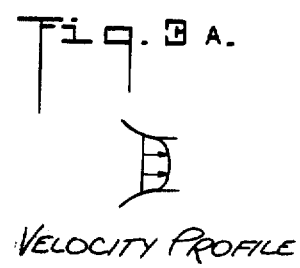
FIG. 3A is the velocity distribution profile of the meter shown in FIG. 3.

The gradual slope of the downstream portion of flow conduit 19 is such as to maintain vortex street stability and to prevent separation of flow from the internal wall of the conduit to a point well downstream of the vortex shedder. The resultant flow distribution profile is shown in FIG. 3A, and it will be seen that the profile is substantially uniform.

Figure 4:
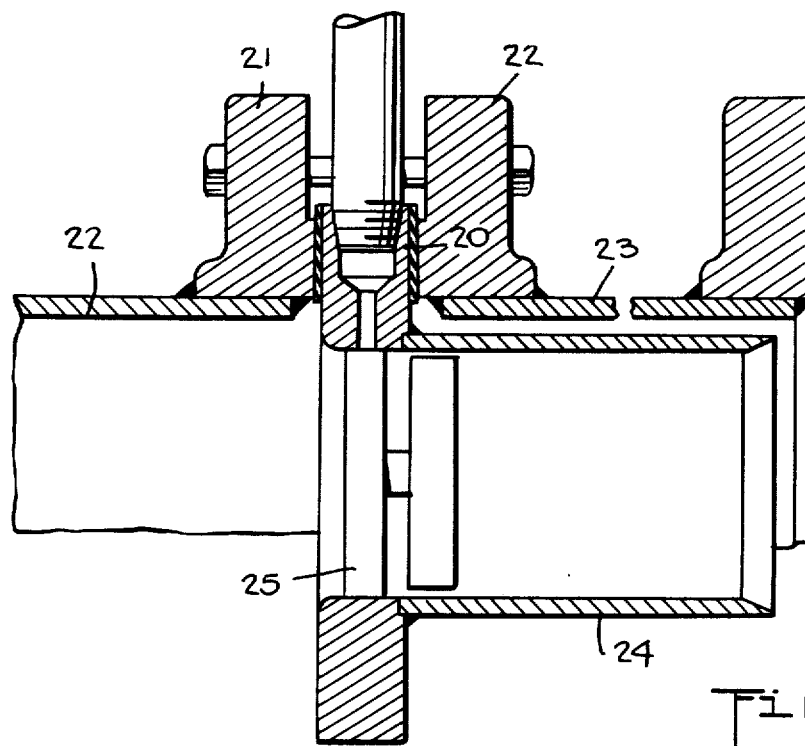
FIG. 4 is a longitudinal section taken through an insert type flowmeter in accordance with the invention.
Figure 5:
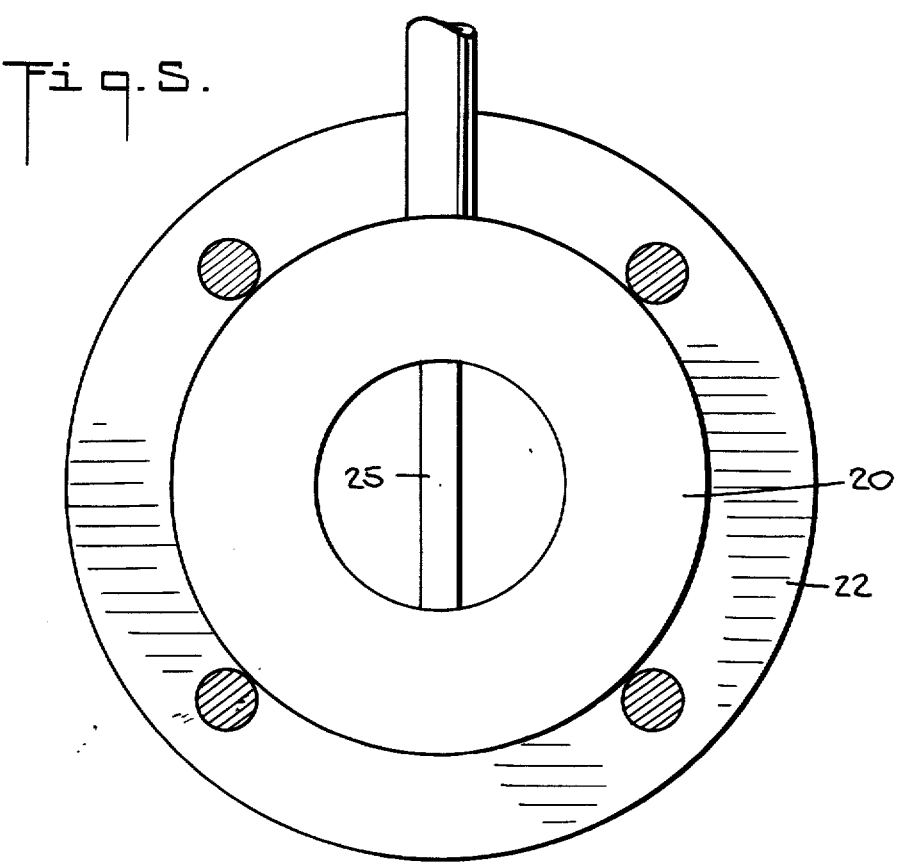
FIG. 5 is an end view of the meter shown in FIG. 4.

Referring now to FIGS. 4 and 5 there is shown an insert-type vortex street flowmeter in which the insert element is provided with a mounting flange 20 which is clamped between the end flange 21 of an upstream pipe section 22 and the end flange 22 of a downstream pipe section 23. Flange 20 supports a flow tube 24 whose internal diameter is smaller than the internal diameter of the upstream pipe section to define a flow constriction. Mounted within flow tube 24 is a vortex-shedding element 25 provided with a rear section having a T-formation. The configuration of the vortex shedding element forms no part of the present invention. In the insert-type arrangement, the flow tube effectively reduces the diameter of a portion of the downstream pipe section.

While there has been shown preferred embodiments of the invention, it will be appreciated that many changes may be made therein without departing from the basic spirit of the invention as disclosed herein.

What I claim is:

1. A vortex-shedding flowmeter which is installed in a line carrying the fluid to be metered, the line having an upstream pipe section and a downstream pipe section, said upstream pipe section having a predetermined internal diameter and internal area, said flowmeter comprising:

A. a flow conduit having a constricted passage therein whose internal area is smaller than said predetermined pipe section area, said passage having a substantially uniform internal diameter throughout its length, said flow conduit being provided with mounting means to interpose said conduit between said upstream and downstream sections to cause all fluid carried by said upstream section to flow through said passage whereby fluid entering said flow conduit through said upstream section encounters said passage and is conditioned thereby to render entering fluid having a non-uniform flow distribution profile more uniform, said conduit being internally rounded at its inlet to smooth the transition of fluid from said upstream section into said passage;

B. an obstacle mounted in said conduit adjacent said inlet to produce periodic vortices in said constricted passage whose frequency is a function of the flow rate of the fluid passing through the conduit; and C. means to convert said periodic vortices into a signal indicative of flow rate.

2. A flowmeter as set forth in claim 1, wherein said mounting means is constituted by flanges at the ends of the conduit which are attachable to complementary flanges on said pipe sections.

3. A flowmeter as set forth in claim 1, wherein the ratio of said predetermined internal diameter and said smaller diameter lies in the range of 1: 0.5 to 0.9.

4. A flowmeter as set forth in claim 1 wherein said flow conduit is inserted into said downstream pipe section.

* * * * *